United States Patent
Bormet

(10) Patent No.: US 12,081,858 B2
(45) Date of Patent: *Sep. 3, 2024

(54) IMAGING SYSTEM FOR IDENTIFYING A BOUNDARY BETWEEN ACTIVE AND INACTIVE PORTIONS OF A DIGITAL IMAGE

(71) Applicant: KARL STORZ Imaging, Inc., Goleta, CA (US)

(72) Inventor: Jonathan Bormet, Goleta, CA (US)

(73) Assignee: KARL STORZ Imaging, Inc.

( * ) Notice: Subject to any disclaimer, the term of this patent is extended or adjusted under 35 U.S.C. 154(b) by 152 days.

This patent is subject to a terminal disclaimer.

(21) Appl. No.: 17/352,645

(22) Filed: Jun. 21, 2021

(65) Prior Publication Data
US 2021/0314470 A1  Oct. 7, 2021

Related U.S. Application Data

(63) Continuation of application No. 15/040,688, filed on Feb. 10, 2016, now Pat. No. 11,044,390.

(51) Int. Cl.
*H04N 5/225* (2006.01)
*G06T 7/12* (2017.01)
(Continued)

(52) U.S. Cl.
CPC ............... *H04N 23/56* (2023.01); *G06T 7/12* (2017.01); *G06T 7/35* (2017.01); *H04N 23/69* (2023.01);
(Continued)

(58) Field of Classification Search
CPC ........ H04N 23/56; H04N 23/69; H04N 23/73; H04N 23/555; G06T 7/12; G06T 7/35; G06T 2207/10068
See application file for complete search history.

(56) References Cited

U.S. PATENT DOCUMENTS 7,136,098 B1   11/2006 Burnett et al.
8,373,748 B2   2/2013 Pang et al.
(Continued)

FOREIGN PATENT DOCUMENTS

DE   102011054031 A1   10/2012

OTHER PUBLICATIONS

Rahul Raguram, et al., A Comparative Analysis of Ransac Techniques Leading to Adaptive Real-Time Random Sample Consensus, ECCV 2008, Part II, LNCS 5303, pp. 500-513, 14 pages, D. Forsyth, P. Torr, and A. Zisserman, 2008, Zurich, Switzerland.

(Continued)

*Primary Examiner* — James T Boylan
(74) *Attorney, Agent, or Firm* — David N. Villalpando; Honigman, LLP

(57) ABSTRACT

An imaging system includes an imaging scope, a camera, an image processor, and a system controller. The imaging scope is configured to illuminate an object and capture light reflected from the object. The camera has a light sensor with a light-sensitive surface configured to receive the captured light from the imaging scope, and generate a digital image representative of the captured light. The image processor is configured to receive the digital image from the camera, and use at least one of a random sample consensus (RANSAC) technique and a Hough Transform technique to (i) identify a boundary between an active portion and an inactive portion of the digital image and (ii) generate boundary data indicative of a characteristic of the boundary. The system controller is configured to receive the boundary data from the image processor, and use the boundary data to select and/or adjust a setting of the imaging system.

17 Claims, 5 Drawing Sheets

(51) Int. Cl.
  *G06T 7/35* (2017.01)
  *H04N 23/56* (2023.01)
  *H04N 23/69* (2023.01)
  *H04N 23/73* (2023.01)
  *H04N 23/50* (2023.01)

(52) U.S. Cl.
  CPC ... *H04N 23/73* (2023.01); *G06T 2207/10068* (2013.01); *H04N 23/555* (2023.01)

(56) References Cited

U.S. PATENT DOCUMENTS

| | | | | |
|---|---|---|---|---|
| 9,060,674 | B2 | 6/2015 | Amling | |
| 9,367,928 | B2* | 6/2016 | de Almeida Barreto | G06T 11/001 |
| 11,044,390 | B2* | 6/2021 | Bormet | G06T 7/12 |
| 2009/0315985 | A1* | 12/2009 | Hirano | A61B 1/042 348/E7.085 |
| 2014/0285676 | A1* | 9/2014 | Barreto | H04N 17/002 348/333.08 |
| 2015/0243033 | A1 | 8/2015 | Uemori | |
| 2022/0392100 | A1* | 12/2022 | Anderson | A61B 90/361 |

OTHER PUBLICATIONS

Bernd Muenzer; et al., Detection of Circular Content Area in Endoscopic Videos for Efficient Encoding and Improved Content Analysis, 20 pages, Technical Report No. TR/ITEC/12/2.03, Nov. 2012, Institute of Information Technology University Klagenfurt, Klagenfurt, Austria.

U. Faust, et al., Endoskopische Kaltlichtquelle mit Intensitätsregelung, Nov. 14, 1991, 63 pages, Institut Für Biomedizinische Technik Der Universität Stuttgart, Stuttgart, Germany.

Martin A. Fischler, et al. Random Sample Consensus: A Paradigm for Model Fitting with Applications to Image Analysis and Automated Cartography, Graphics and Image Processing, Communicaitons of the ACM, J.D. Foley ed., Jun. 1981, vol. 24, No. 6, pp. 381-395, 15 pages.

Marco Zuliani, Ransac for Dummies (draft), Jul. 4, 2014, 101 pages.

Kollreider, Klaus; Ext. European Search Report, Apr. 27, 2017 pp. 1-9, Munich, Germany Application No. 17154796.1-1906.

Stehle et al.,Dynamic Distortion Correction for Endoscopy Systems with Exchangeable Optics, Jan. 1, 2009, p. 142-146, 6 pages.

Stache et al., Robust High-Speed Melt Pool Measurement for Laser Welding with Sputter Detection Capability, Sep. 12, 2017; 10 pages; Pattern Recognition, Springer Berlin Heidelberg, Berlin.

Kollreider, Klaus; European Office Action, Application No. 17154796.1, Nov. 4, 2019, pp. 1-6, Munich, Germany.

* cited by examiner

IMAGING SYSTEM FOR IDENTIFYING A BOUNDARY BETWEEN ACTIVE AND INACTIVE PORTIONS OF A DIGITAL IMAGE

TECHNICAL FIELD

The present disclosure generally relates to an imaging system, a related method, and a computer-readable medium storing instructions for performing the method. The present disclosure more particularly relates to an imaging system, a related method, and a computer-readable medium that each involve identification of a boundary between an active portion and an inactive portion of a captured digital image.

BACKGROUND

An imaging system having an imaging scope (e.g., an endoscope, an exoscope, a boroscope) and a camera can be used for capturing light reflected from an object, converting the captured light into a digital image, and displaying the digital image (or a modified version thereof) on a monitor for viewing by a user. For example, German Patent Publication No. DE102011054031A1 discloses an imaging system that uses an exoscope that enables the illumination and observation of an operation field during a surgical operation from a working distance (e.g., 25 cm to 75 cm). The exoscope is affixed on a holder in a suitable position, and with a suitable orientation, such that the exoscope does not obstruct a surgical team's view of the operation field during the surgical operation.

The imaging system is typically configured such that the captured light forms a captured light beam having an at least partially circular cross-sectional shape (e.g., partially circular, ovular, elliptical, etc.). In contrast, the light sensor used to the convert the captured light into a digital image (e.g., a charge-coupled device (CCD), a complementary metal-oxide semiconductor (CMOS), etc.) typically has a rectangular-shaped light-sensitive surface for receiving and sensing the captured light beam. As a result, the digital image generated by such light sensors can include an active portion corresponding to the portion of the light-sensitive surface occupied by the captured light, an inactive portion corresponding to the portion of the light-sensitive surface that was not occupied by the captured light, and a boundary defined between the active portion and the inactive portion of the digital image.

The respective characteristics of the active and inactive portions of the digital image, and thus the characteristics of the boundary defined therebetween (e.g., center, radius, position, shape, size, etc.) can vary over time depending on one or more characteristics of the captured light beam (e.g., center, radius, position, shape, size, etc.). For example, the imaging system can include a zoom device that can be selectively adjusted over time to change the diameter of the captured light beam before it is received by the light-sensitive surface of the light sensor. This, in turn, can change the respective characteristics of the active and inactive portions of the digital image generated by the light sensor. Also, the camera of the imaging system can be configured for interchangeable use with various different types (e.g., classes) of imaging scopes that each form captured light beams having characteristics that are different from one another.

These imaging systems can be disadvantageous in that they are typically "blind" to (i.e., not configured to determine) the settings of the zoom device, and/or the type of imaging scope that is being used. As a result, these imaging systems are typically blind as to whether a generated digital image includes (i) only an active portion, or (ii) an active portion, an inactive portion, and a boundary defined therebetween. This limits the ability of these imaging systems to automatically select and/or adjust a setting of the camera (e.g., exposure, gain, etc.). For example, if one of these imaging systems generates a digital image with an active portion, an inactive portion, and a boundary therebetween, and if the imaging system automatically selects an exposure setting of the camera without knowing one or more characteristics of the boundary (e.g., center, radius, position, shape, size, etc.), then the camera may overexpose the active portion of the digital image in a futile attempt to adequately expose the inactive portion of the digital image. Similar issues can occur with tone mapping procedures, in which the imaging systems may futilely attempt to manipulate the contrast of the inactive portion of a digital image. These disadvantages can also prevent these imaging systems from: (i) automatically adjusting the size of an active portion of a digital image to fit a monitor screen, and (ii) automatically centering the active portion of the digital image on a monitor.

Aspects of the present invention are directed to these and other problems.

SUMMARY

According to an aspect of the present invention, an imaging system is provided that includes an imaging scope, a camera, an image processor, and a system controller. The imaging scope is configured to illuminate an object and capture light reflected from the object. The camera has a light sensor with a light-sensitive surface configured to receive the captured light from the imaging scope, and generate a digital image representative of the captured light. The image processor is configured to receive the digital image from the camera, and use at least one of a random sample consensus (RANSAC) technique and a Hough Transform technique to (i) identify a boundary between an active portion and an inactive portion of the digital image and (ii) generate boundary data indicative of a characteristic of the boundary. The system controller is configured to receive the boundary data from the image processor, and use the boundary data to select and/or adjust a setting of the imaging system.

According to another aspect of the present invention, a method is provided that includes the steps of: (i) receiving, by an image processor, a digital image generated by an imaging system; (ii) using, by the image processor, at least one of a RANSAC technique and a Hough Transform technique to identify a boundary between an active portion and an inactive portion of the digital image; (iii) generating, by the image processor, boundary data indicative of a characteristic of the boundary; and (iv) automatically selecting and/or adjusting one or more settings of the imaging system based on the boundary data.

According to another aspect of the present invention, a computer-readable medium storing instructions is provided, the instructions including the steps of: (i) using at least one of a RANSAC technique and a Hough Transform technique to identify a boundary between an active portion and an inactive portion of a digital image generated using an imaging system; (ii) generating boundary data indicative of a characteristic of the boundary; and (iii) automatically selecting and/or adjusting one or more settings of the imaging system based on the boundary data.

In addition to, or as an alternative to, one or more of the features described above, further aspects of the present invention can include one or more of the following features, individually or in combination:

the image processor includes a grayscale converter configured to convert the digital image to a grayscale digital image, and the image processor includes a boundary point detector configured to filter the grayscale digital image to detect boundary points within the grayscale digital image, each of the boundary points corresponding to at least one pixel of the grayscale digital image that might possibly form a portion of the boundary;

the image processor includes a boundary point thinner configured to perform a non-maximal suppression on the boundary points, and to eliminate any boundary points that are unlikely to correspond to an area of transition between the active portion and the inactive portion of the digital image;

the image processor includes a boundary identifier configured to fit a curve to the boundary points to thereby identify the boundary and the generate boundary data;

the image processor is configured to use a RANSAC technique to identify the boundary and generate the boundary data, the RANSAC technique including: (a) randomly selecting a boundary point subset having at least three of the boundary points and determining a fit for the boundary point subset, (b) checking the fit against all of the boundary points to determine an inlier number for the fit, the inlier number being the number of all of the boundary points that lie within the fit, (c) repeating steps (a) and (b) a plurality of times to determine a fit and an inlier number for a plurality of boundary point subsets, and (d) selecting a best fit, the best fit being the fit having the inlier number with the greatest magnitude;

the image processor is configured to use a RANSAC technique to identify the boundary and generate the boundary data, the RANSAC technique including: (a) randomly selecting a boundary point subset having at least three of the boundary points and determining a fit for the boundary point subset, (b) repeating step (a) a plurality of times to determine a respective fit for each of a plurality of boundary point subsets, and (c) for each of the respective fits determined in steps (a) and (b), comparing the respective fit with all of the boundary points to determine a median error measurement for the respective fit, and (d) selecting a best fit, the best fit being the respective fit having the lowest median error measurement;

the fit for the boundary point subset is determined using at least one of a sum of squared error metric, a sum of absolute error metric, and a maximum absolute error metric;

the image processor includes a boundary identifier configured to fit a curve to the boundary points using a best fit of boundary points detected from a previously-analyzed digital image;

the image processor is configured to use a Hough Transform technique to identify the boundary and generate the boundary data, the Hough Transform including: (a) providing an array of index points, each index point corresponding to a radius and center coordinates of a candidate fit for the boundary points, (b) initializing all of the index points with zeros, (c) for each of the boundary points, incrementing a count of each of the index points corresponding to candidate fits that include the respective boundary point, and (d) selecting a best fit, the best fit being the candidate fit corresponding to the index point with a count that is greatest in magnitude;

the image processor includes an error and reasonableness detector configured to receive the boundary data and the curve from the boundary identifier and determine whether or not a number of the boundary points lying within the curve satisfies a predetermined confidence measure;

the image processor includes an error and reasonableness detector configured to receive the boundary data and the curve and determine whether the curve is reasonable in view of a displayable area of the digital image;

the system controller is configured to use the boundary data to automatically select at least one of an exposure setting and a gain setting of the camera;

the system controller is configured to use the boundary data to automatically reduce an importance of pixel intensities that correspond to the inactive portion of the digital image;

the system controller is configured to use the boundary data to filter noise in the inactive portion of the digital image;

the system controller is configured to use the boundary data to at least one of (i) automatically adjust sharpness of the digital image, (ii) automatically perform digital zooming on the digital image, (iii) automatically re-center the digital image on a monitor and (iv) improve performance of a tone mapping technique performed by the imaging system;

the active portion of the digital image corresponds to an interior portion of the light-sensitive surface that was occupied by the captured light, and the inactive portion of the digital image corresponds to a peripheral portion of the light-sensitive surface that was not occupied by the captured light;

the characteristic of the boundary is at least one of a center, a radius, a position, a size, and a shape of the boundary;

the imaging scope includes an image transmission device that transmits the captured light from an objective lens located proximate a distal end of the imaging scope to a proximal end of the imaging scope, and the camera is disposed relative to the proximal end of the imaging scope;

the image transmission device transmits the captured light therethrough in the form of a captured light beam having a cross-sectional shape that is at least partially circular; and the light-sensitive surface of the light sensor has a rectangular shape;

the camera is releasably connected to the imaging scope, and the imaging scope is a first type of imaging scope, and the camera is configured to be releasably connected to a second type of imaging scope, the second type being different than the first type;

the camera is a video camera, and the digital image generated by the light sensor represents one of a plurality of time-sequenced frames of a digital video; and the camera includes a zoom device configured to receive the captured light from the imaging scope before the captured light is received by the light sensor, and the zoom device is selectively adjustable between a low magnification configuration, in which the zoom device magnifies the captured light such that the captured light occupies only a portion of the light-sensitive surface when received thereon, and a high magnification configuration, in which the zoom device magnifies the captured light such that the captured light occupies all of the light-sensitive surface of the light sensor when received thereon.

These and other aspects of the present invention will become apparent in light of the drawings and detailed description provided below.

DETAILED DESCRIPTION

The present disclosure describes an imaging system 10 (see FIG. 1), a related method, and a computer-readable medium storing instructions for performing the method.

Figure 1:
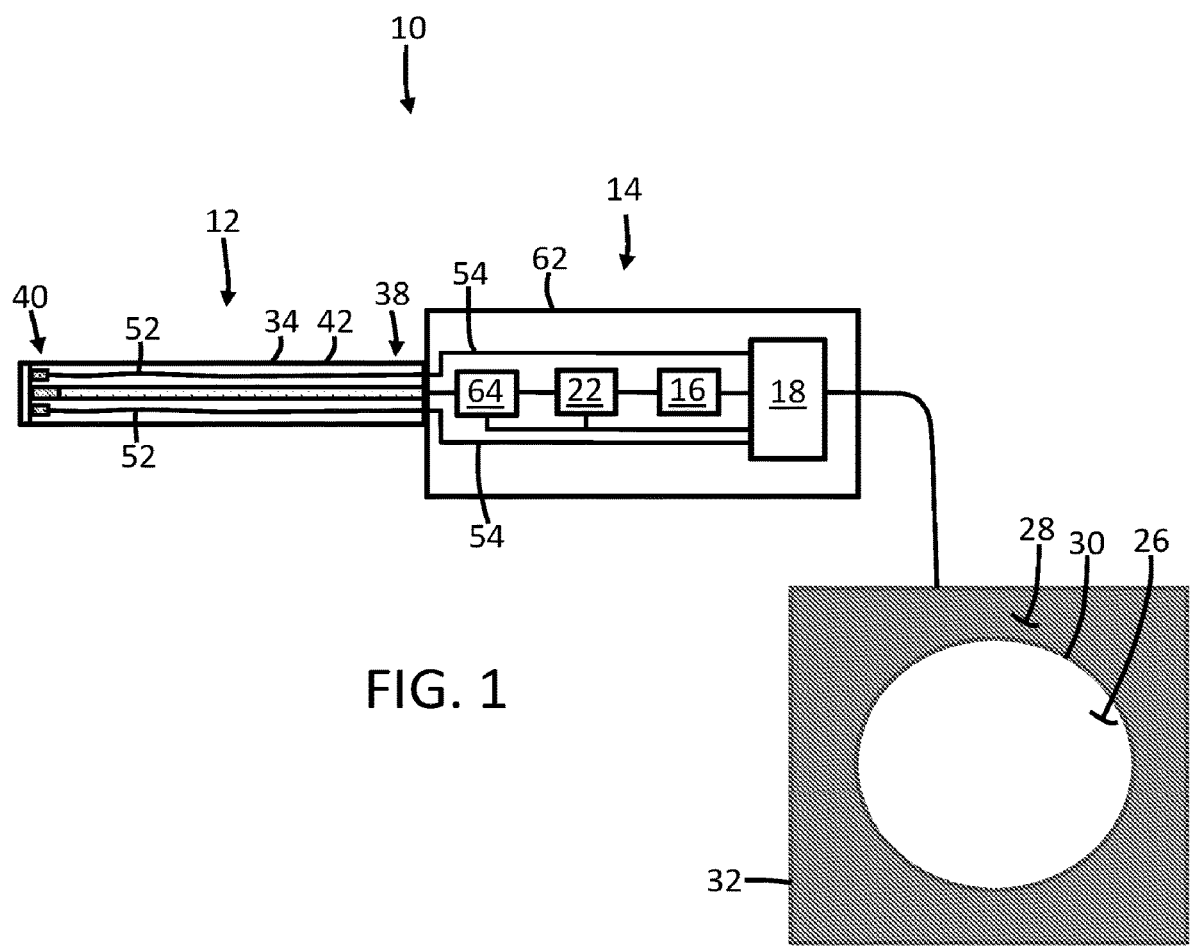
FIG. 1 schematically illustrates an embodiment of the present imaging system.
Figure 2:
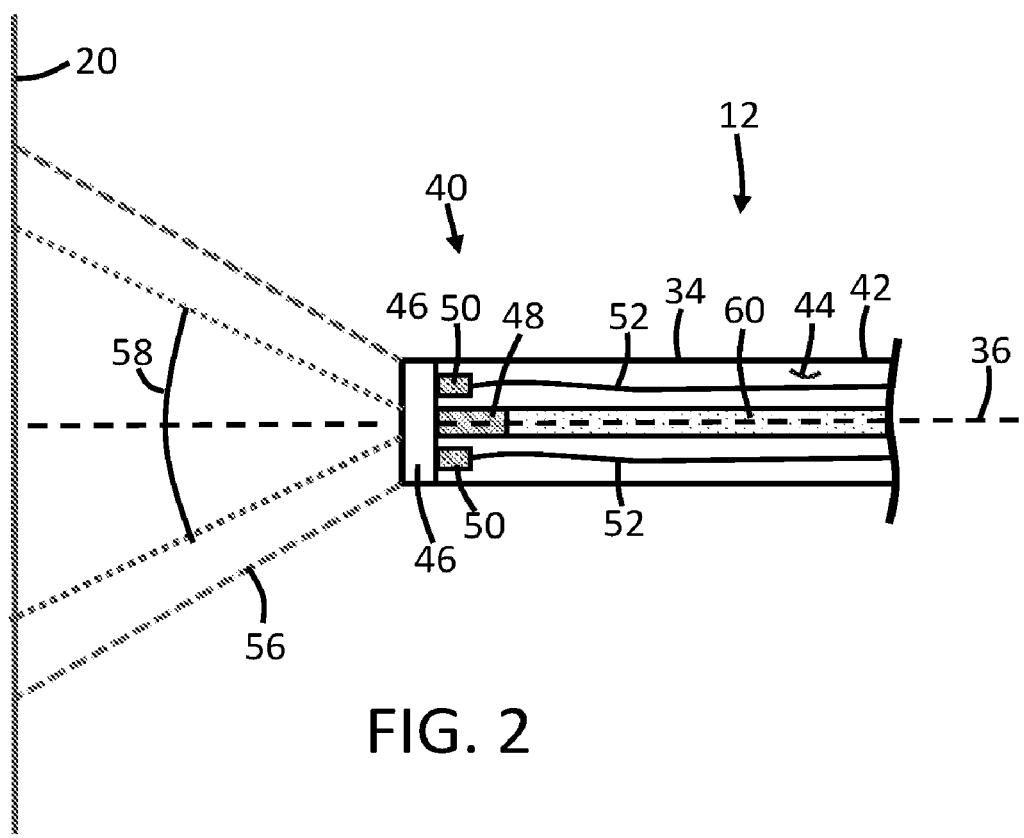
FIG. 2 schematically illustrates a portion of the imaging scope of the imaging system of FIG. 1.
Figure 3:
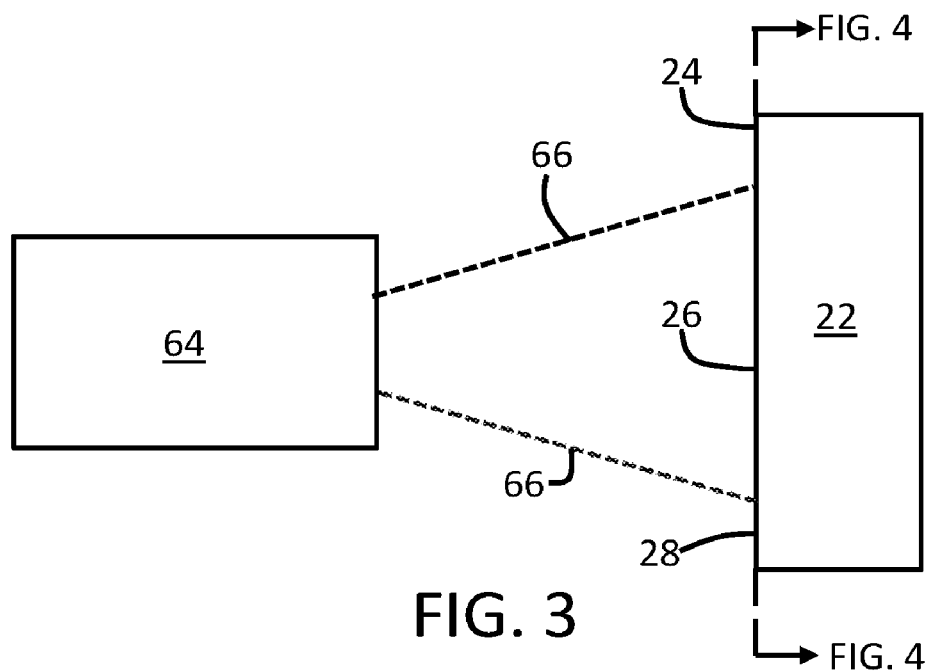
FIG. 3 schematically illustrates a side view of the zoom device and light sensor of the imaging system of FIG. 1 during operation of the zoom device in a low magnification configuration.
Figure 4:
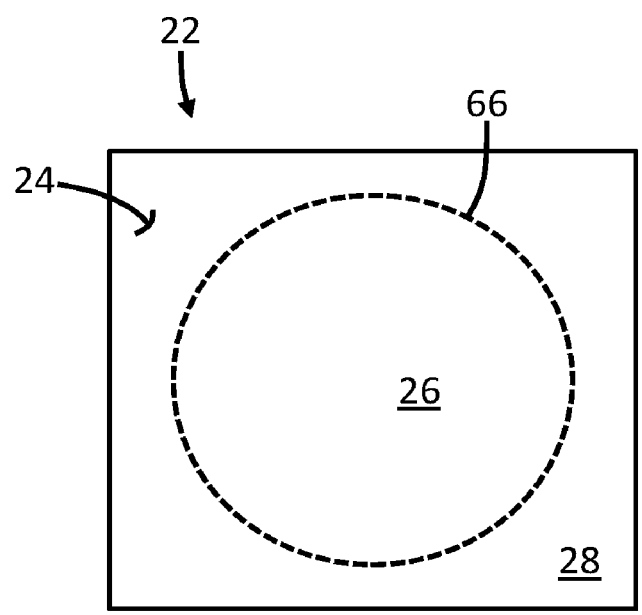
FIG. 4 schematically illustrates a front view of the light sensor shown in FIG. 3.

Referring to FIGS. 1 and 2, the imaging system 10 includes an imaging scope 12, a camera 14, an image processor 16, and a system controller 18.

The imaging scope 12 illuminates an object 20 (e.g., an internal body cavity of a patient), captures light reflected from the object 20, and transmits the captured light to the camera 14. The camera 14 includes a light sensor 22 with a light-sensitive surface 24 (see FIGS. 3-6). The light-sensitive surface 24 receives the captured light, and the light sensor 22 generates a digital image representative thereof. The image processor 16 receives the digital image from the camera 14 and processes the digital image to determine whether the digital image includes (i) only an active portion 26, or (ii) an active portion 26 and an inactive portion 28. If the digital image includes an active portion 26 and an inactive portion 28, the image processor 16 identifies a boundary 30 between the active portion 26 and the inactive portion 28, and the image processor 16 generates boundary data indicative of one or more characteristics of the boundary 30 (e.g., center, radius, position, shape, size, etc.). The image processor 16 uses a random sample consensus (RANSAC) technique and/or a Hough Transform technique in identifying the boundary 30 and generating boundary data. The system controller 18 receives the boundary data from the image processor 16, and can use the boundary data to automatically select and/or adjust one or more settings of the imaging system 10. In some embodiments, the system controller 18 can also modify the digital image to include a representation of the boundary 30 so that the boundary 30 is visible to a user when the digital image (or a modified version thereof) is displayed on a monitor 32 as shown in FIG. 1.

Referring still to FIGS. 1 and 2, in the illustrated embodiment, the imaging scope 12 is a flexible endoscope intended for use in medical endoscopic investigations or procedures. The imaging scope 12 includes a flexible shaft 34 that extends along a longitudinal axis 36 between a proximal end 38 and a distal end 40 thereof. The shaft 34 includes a tubular shaft wall 42 and a shaft channel 44 defined by an inner surface of the shaft wall 42. The outer surface of the shaft wall 42 defines a diameter of approximately four millimeters (4 mm). The shaft channel 44 extends through the shaft 34 along the longitudinal axis 36 thereof. The proximal end 38 of the shaft 34 is releasably connected to the camera 14. The distal end 40 of the shaft 34 includes a fluid-tight window 46 made of glass or another suitable material that is at least substantially transparent. The imaging scope 12 further includes an objective lens 48 and a plurality of light sources 50 positioned within the shaft channel 44 proximate the window 46. The light sources 50 are positioned radially between the objective lens 48 and the shaft wall 42, and are arranged at different circumferential positions about the longitudinal axis 36 of the shaft 34. The light sources 50 are releasably connected to the system controller 18 via wires 52, 54. The system controller 18 controls (e.g., activates, deactivates) the light sources 50 such that the light sources 50 selectively illuminate an object 20 by selectively emitting illumination light 56 through the window 46 and out of the distal end 40 of the imaging scope 12. The objective lens 48 has a field of view 58, and captures light reflected from the object 20 through the window 46. The imaging scope 12 includes an image transmission device 60 that transmits the captured light from the objective lens 48 (located proximate the distal end 40 of the shaft 34) to the proximal end 38 of the shaft 34. In the illustrated embodiment, the image transmission device 60 is a rod lens system, and the image transmission device 60 transmits the captured light therethrough in the form of a captured light beam having a circular cross-sectional shape.

In other embodiments not shown in the drawings, the imaging scope 12, and/or components thereof, can be configured in various different ways. For example, in other embodiments, the imaging scope 12 can be an exoscope or a boroscope, as opposed to an endoscope. The imaging scope 12 can be rigid, as opposed to flexible. The outer surface of the shaft wall 42 can define a diameter of approximately five millimeters (5 mm), ten millimeters (10 mm), or another magnitude. The imaging scope 12 can be configured for a non-medical use, as opposed to a medical use. The proximal end 38 of the shaft 34 can be integrally connected to the camera 14. The objective lens 48 and the light sources 50 can be arranged in a different manner relative to one another, or in a different manner relative to the distal end 40 of the shaft 34. The image transmission device 60 can additionally or alternatively include various different types of lenses or light conductors capable of transmitting the captured light from the objective lens 48 to the proximal end 38 of the shaft 34. The image transmission device 60 can be configured to transmit the captured light therethrough in the form of a captured light beam having another at least partially circular cross-sectional shape (e.g., ovular, elliptical, etc.).

Referring to FIG. 1, in the illustrated embodiment, the camera 14 includes a camera housing 62 in which the components of the camera 14 (e.g., the light sensor 22) are disposed. The camera housing 62 also serves as a handle of the imaging system 10 that can be grasped by a user during use of the imaging system 10. The camera housing 62 is configured to be releasably connected to the proximal end 38 of the shaft 34 of the imaging scope 12. The camera 14 is configured to be used interchangeably (e.g., releasably connected) with various different types (e.g., classes) of imaging scopes.

In the illustrated embodiment, the camera 14 is a video camera, and thus the digital image generated by the light sensor 22 can represent one of a plurality of time-sequenced frames of a digital video. The light sensor 22 included in the camera 14 is a CCD with a rectangular-shaped light-sensitive surface 24 configured to receive and sense the captured light received from the imaging scope 12.

Referring to FIGS. 1 and 3-6, in the illustrated embodiment, the camera 14 also includes a zoom device 64 that receives the captured light from the imaging scope 12 before it is received by the light sensor 22. The zoom device 64 is selectively adjustable between a low magnification configuration (i.e., a "zoomed out" configuration) and a high magnification configuration (i.e., a "zoomed in" configuration). In a low magnification configuration (see FIGS. 3 and 4), the zoom device 64 magnifies the captured light 66 such that it occupies only a portion of the light-sensitive surface 24 when it is received thereon. As a result, the digital image generated by the light sensor 22 includes an active portion 26 corresponding to the interior portion of the light-sensitive surface 24 that was occupied by the captured light 66, and an inactive portion 28 corresponding to the peripheral portion of the light-sensitive surface 24 that was not occupied by the captured light 66. In a high magnification configuration (see FIGS. 5 and 6), the zoom device 64 magnifies the captured light 66 such that it occupies an entirety of the light-sensitive surface 24 of the light sensor 22 when it is received thereon. As a result, the digital image generated by the light sensor 22 includes only an active portion 26.

Referring to FIG. 1, in the illustrated embodiment, the image processor 16 is electrically connected to the camera 14, and in particular, the light sensor 22 of the camera 14. The image processor 16 receives the digital image from the camera 14 and processes the digital image to determine whether the digital image includes (i) only an active portion 26, or (ii) an active portion 26 and an inactive portion 28, as will be described in more detail below. In the illustrated embodiment, the image processor 16 is housed within the camera housing 62 of the camera 14. In other embodiments not illustrated in the drawings, the image processor 16 can be remotely positioned relative to the camera 14.

Figure 5:
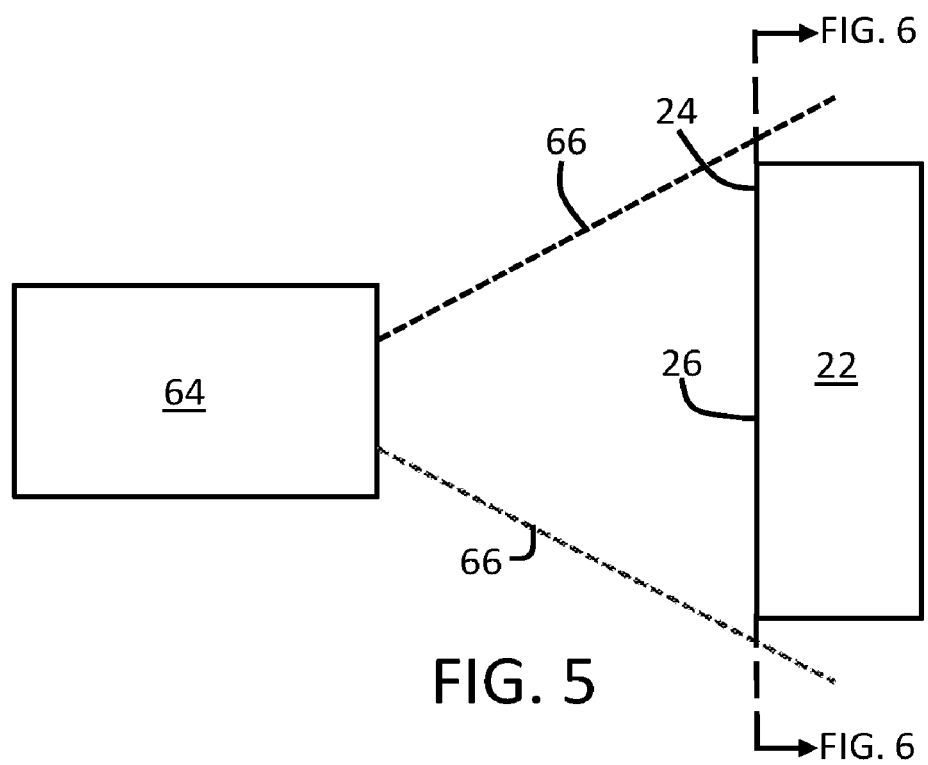
FIG. 5 schematically illustrates a side view of the zoom device and light sensor of the imaging system of FIG. 1 during operation of the zoom device in a high magnification configuration.
Figure 6:
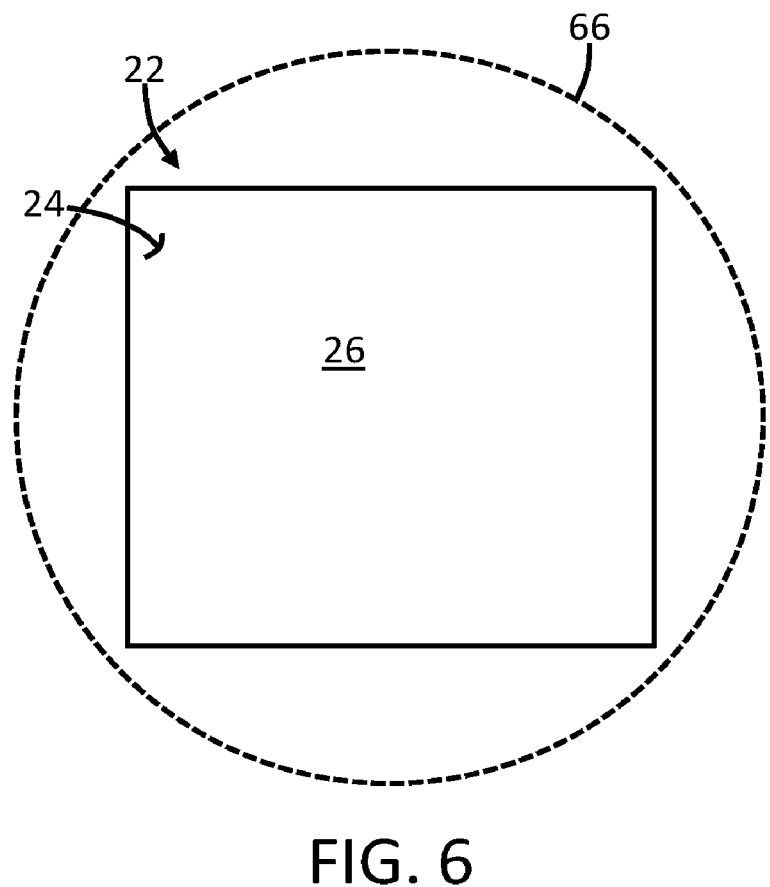
FIG. 6 schematically illustrates a front view the light sensor of the imaging system of FIG. 1 during operation as shown in FIG. 5.

Referring to FIG. 5, in the illustrated embodiment, the image processor 16 includes an input 68, a grayscale converter 70, a boundary point detector 72, a boundary point thinner 74, a memory device 76, a boundary identifier 78, an error and reasonableness detector 80, and an output 82. Each component of the image processor 16 is described in detail below. The functionality of each component of the image processor 16 can be implemented using analog and/or digital hardware (e.g., counters, switches, logic devices, memory devices, programmable processors, non-transitory computer-readable storage mediums), software, firmware, or a combination thereof. In some embodiments, the image processor 16, or one or more components thereof, can perform one or more of the functions described herein by executing software, which can be stored, for example, in a memory device. A person having ordinary skill in the art would be able to adapt (e.g., construct, program) the components of the image processor 16 to perform the functionality described herein without undue experimentation. Although the components of the image processor 16 are described as being discrete components of the image processor 16, in other embodiments one or more of those components can be combined into a single component.

The grayscale converter 70 receives the digital image via the input 68 of the image processor 16. The grayscale converter 70 converts the digital image to a grayscale digital image using max colors (e. g., R, G, B) and/or a weighted average of color channels (e.g., luminance).

The boundary point detector 72 receives the grayscale digital image from the grayscale converter 70 and filters it with a filter (e.g., a high pass kernel filter) to detect boundary points within the grayscale digital image. Each of the boundary points corresponds to at least one pixel of the grayscale digital image that might possibly form a portion of a boundary 30 between an active portion 26 and an inactive portion 28 of the digital image. In instances in which the zoom device 64 is in a low magnification configuration (i.e., when the digital image includes an active portion 26, an inactive portion 28, and a boundary 30 defined therebetween) (see FIGS. 3 and 4), the boundary point detector 72 should detect a plurality of boundary points. In instances in which the zoom device 64 is in a high magnification configuration (i.e., when the digital image includes only an active portion 26) (see FIGS. 5 and 6), the boundary point detector 72 should detect zero (or substantially zero) boundary points. In instances in which the zoom device 64 is in a high magnification configuration, the boundary point detector 72 can make a determination that the digital image includes only an active portion 26, and can generate boundary data indicative of this determination. In such instances, the boundary data and the digital image can be transmitted to the system controller 18 (discussed below) via the output 82 of the image processor 16, and without the "downstream" components of the image processor 16 (e.g., the boundary identifier 78, the error and reasonableness detector 80, etc.) taking any further action relative to the digital image.

The boundary point thinner 74 receives the grayscale digital image and any boundary points detected by the boundary point detector 72. The boundary point thinner 74 performs a non-maximal suppression on the boundary points, and eliminates any boundary points that do not generate a local response peak. Additionally or alternatively, the boundary point thinner 74 can consider the relative positioning of the boundary points within the grayscale digital image, and can eliminate boundary points that are unlikely to correspond to an area of transition (e.g., a boundary 30) between an active portion 26 and an inactive portion 28 of the digital image.

The memory device 76 receives and stores the digital image and any detected boundary points thereof, as well as any other information and/or data that may need to be stored and/or retrieved by the components of the image processor 16 in order to perform the functionality described herein.

In instances in which boundary points have been detected in the grayscale digital image, the boundary identifier 78 selectively retrieves the boundary points from the memory device 76 and uses at least one of a RANSAC technique and a Hough Transform technique to (i) identify the boundary 30 between the active portion 26 and the inactive portion 28 of the digital image and (ii) generate boundary data indicative of one or more characteristics of the boundary 30 (e.g., center, radius, position, shape, size, etc.).

In the illustrated embodiment, the boundary identifier 78 uses a RANSAC identifier. RANSAC is an iterative technique that can be used to estimate parameters of a mathematical model from a set of observed data which contains outliers. Detailed descriptions of RANSAC can be found, for example, in Fischler et al., *Random Sample Consensus: A Paradigm for Model Fitting with Applications to Image Analysis and Automated Cartography,* 24 Graphics and Image Processing 381-95 (J. D. Foley ed., June 1981), and Marco Zuliani, RANSAC for Dummies (2014), available at http://old.vision.ece.ucsb.edu/~zuliani/Research/RANSAC/docs/RANSAC4Dummies.pdf.

In the illustrated embodiment, the RANSAC technique performed by the boundary identifier 78 involves randomly selecting a boundary point subset having at least three (e.g., three, four, five, etc.) of the boundary points, and determining a fit (e.g., a least square error fit) for the boundary point subset. The number of randomly selected boundary points of the boundary point subset can depend at least in part on the shape or expected shape of the boundary 30. For example, a boundary point subset having three randomly selected boundary points may be acceptable when the expected shape of the boundary 30 is circular, but four or more randomly selected boundary points may be needed when the expected shape of the boundary 30 is elliptical. The fit for the boundary point subset can be determined using various different error metrics, including, for example, the 2-norm error metric (i.e., sum of squared error), the 1-norm error metric (sum of absolute error), or the infinity norm error metric (maximum absolute error).

Next, the boundary identifier 78 checks the fit against all of the boundary points (not just those from the selected boundary point subset) to determine an inlier number for the fit. The inlier number is the number of all of the boundary points that lie within the fit within a predetermined tolerance.

These steps can be repeated a plurality of times for each digital image from which boundary points were detected. After a plurality of iterations, the fit with the inlier number having the highest magnitude (e.g., the fit that includes the most boundary points lying within the fit) is selected as the best fit. The boundary identifier 78 can use the selected best fit to generate boundary data indicative of one or more characteristics of the boundary 30 (e.g., center, radius, position, shape, size, etc.). This approach allows for a best fit to be selected even when the boundary 30 has a shape that is not entirely encompassed within the digital image. That is, when the zoom device 64 is between the low magnification configuration (see FIGS. 3 and 4) and the high magnification configuration (see FIGS. 5 and 6), the boundary 30 can appear to have the shape of a circle that is cut off along each edge of the digital image, for example. In such instances, the respective fit of each boundary point subset (and thus the selected best fit) can be determined based on an assumption that the boundary 30 would form a complete shape (e.g., a complete circle not cut off along each edge of the digital image) if the digital image was large enough to entirely encompass the complete shape.

In some embodiments, instead of selecting the best fit to be the fit with the most inlying boundary points, as described above, the best fit can be selected using a least median error approach, in which the fit with the least median error is selected as the best fit. In such embodiments, the boundary identifier 78 compares each fit with all of the boundary points (not just those from the selected boundary point subset) to determine a median error measurement for each fit. The fit having the lowest median error measurement is selected as the best fit. In such embodiments, the median will typically represent the 50th percentile of errors. However, one could also minimize other error percentiles with similar results. This approach can be advantageous in that it avoids the need to define a threshold for which boundary points are to be considered inliers. However, this approach can be disadvantageous from a computational feasibility standpoint, because it requires computation of all of the error scores and then at least a partial sorting of the error scores.

As indicated above, in the illustrated embodiment, the camera 14 is a video camera, and thus the digital image generated by the light sensor 22 of the camera 14 can represent one frame of a digital video. Accordingly, in the illustrated embodiment, for each new digital image that is generated (i.e., each new frame of the digital video), the RANSAC technique is repeated. In addition, for each new digital image that is captured, a best fit of a previously-analyzed digital image, and/or minor perturbations thereof (slightly larger/smaller, slightly different center, etc.), can be tried with the new digital image. This feature enables the image processor 16 to upgrade to a "better" best fit if one is ever found. Also, for each new digital image that is generated, the best fit of a previously-analyzed digital image can serve as a starting point from which the RANSAC technique is performed, thereby avoiding the need to start the RANSAC technique from scratch for each new digital image (i.e., for each new frame of the digital video). The rate at which the camera 14 generates new digital images (i.e., the frame rate of the digital video generated by the camera 14) can vary depending on the particular application. In some embodiments (e.g., embodiments in which the frame rate is relatively high), the image processor 16 can be configured so that only some of the digital images produced by the camera 14 (e.g., selected at periodic intervals) are processed by the image processor 16 and the components thereof. This feature can be advantageous from a computational feasibility standpoint, and can still allow the benefits of the imaging system 10 to be achieved, because the boundary between an active portion and an inaction portion thereof typically does not change frequently and rapidly from frame to frame.

As indicated above, the boundary identifier 78 can additionally or alternatively use a Hough Transform technique in identifying the boundary 30 and generating boundary data. The Hough Transform technique can be especially useful in embodiments in which the boundary 30 can be expected to have a circular shape (e.g., embodiments in which a captured light beam has a circular cross-sectional shape). In such embodiments, the boundary identifier 78 receives an array of index points, each index point corresponding to a radius and center coordinates (e.g., "x" and "y" Cartesian coordinates) of a different candidate fit for the boundary points. The index points of the array each have a count, and the counts of all index points are initialized with zeros. For each of the boundary points, the boundary identifier 78 increments the count of each index point corresponding to the different candidate fits that include the respective boundary point. Finally, the boundary identifier 78 selects a best fit. The best fit is the candidate fit corresponding to the index point with the highest count. The boundary identifier 78 can use the best fit to generate boundary data indicative of one or more characteristics of the boundary 30 (e.g., center, radius, position, shape, size, etc.). The Hough Transform technique has the potential to be more accurate and reliable than the RANSAC technique, as all of the boundary points and all the candidate fits are considered. However, the Hough Transform technique can be disadvantageous from a computational feasibility standpoint, as many indices in the array need to be maintained simultaneously.

Figure 7:
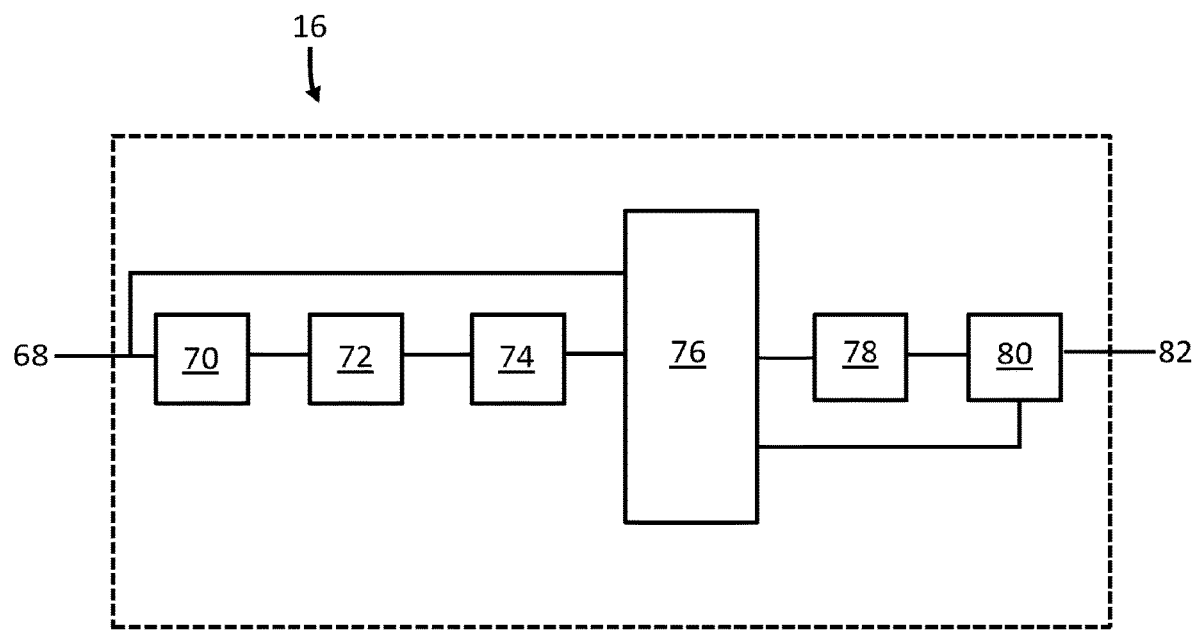
FIG. 7 schematically illustrates the image processor of the imaging system of FIG. 1.

Referring still to FIG. 7, in the illustrated embodiment, the image processor 16 also includes an error and reasonableness detector 80 that receives the boundary data and the selected best fit from the boundary identifier 78. The error and reasonableness detector 80 analyzes the selected best fit to determine whether or not the number of inliers (i.e., boundary points lying within the best fit) satisfies a predetermined confidence measure (e.g., 75% inliers). This feature can be advantageous because the best fit selected by the boundary identifier 78 may not always be a "good" fit. This can happen, for example, when the zoom device 64 is in a high magnification configuration (see FIGS. 5 and 6) and the digital image includes only an active portion 26, or when the object 20 being imaged is so dark that there is insufficient contrast between the active portion 26 and the inactive portion 28 of the digital image.

The error and reasonableness detector 80 also analyzes the selected best fit to determine whether it is "reasonable." For instance, a selected best fit indicating that the center of the boundary 30 is outside of the displayable area of the digital image will be rejected as an unreasonable (e.g., unlikely) characterization of the boundary 30. If the error and reasonableness detector 80 determines that a boundary 30 has been confidently detected, it will cause the boundary data received from the boundary identifier 78 to be transmitted to the system controller 18 via the output 82 of the image processor 16. If, on the other hand, the error and reasonableness detector 80 determines that a boundary 30 has not been confidently detected, it can first instruct the boundary identifier 78 to repeat the above-described RANSAC technique (e.g., using a best fit of a previously-analyzed digital image, and/or a minor perturbation thereof). If this does not improve the confidence measure or reasonableness of the best fit newly selected by the boundary identifier 78, the error and reasonableness detector 80 can ultimately determine that the digital image does not include a boundary 30 (e.g., as when the digital image includes only an active portion 26). The error and reasonableness detector 80 can update the boundary data received from the boundary identifier 78 accordingly, and can cause the updated boundary data received from the boundary identifier 78 to be transmitted to the system controller 18 via the output 82 of the image processor 16.

Referring to FIG. 1, in the illustrated embodiment, the system controller 18 is electrically connected to the output 82 of the image processor 16, and receives the digital image and the boundary data therefrom. The system controller 18 can automatically select and/or adjust one or more settings of the imaging system 10 based on the boundary data, as described in more detail below. In some embodiments, the system controller 18 can also modify the digital image to include a representation of the boundary 30. In the illustrated embodiment, the system controller 18 is housed within the camera housing 62 of the camera 14. In other embodiments not illustrated in the drawings, the system controller 18 can be remotely positioned relative to the camera 14.

The system controller 18 can automatically select and/or adjust various different settings of the imaging system 10 based on the boundary data. For example, in some embodiments, the system controller 18 can use the boundary data to automatically select an exposure setting of the camera 14, automatically select a gain setting of the camera 14, and/or automatically reduce the importance of pixel intensities that have been determined to correspond to an inactive portion 28 of the digital image. The system controller 18 can use the boundary data in automatically controlling the camera 14 to aggressively filter noise in an area of the digital image that has been determined to correspond to an inactive portion 28 of the digital image. The system controller 18 can use the boundary data in automatically adjusting sharpness of the digital image, automatically performing digital zooming on the digital image, and/or automatically performing re-centering techniques on the digital image on a monitor 32. This can allow the imaging system 10 to maintain an area and position of the respective active portions 26 of digital images as a digital video including those digital images is displayed on a monitor 32. The system controller 18 can use the boundary data to automatically improve a tone mapping technique performed by the imaging system 10.

The functionality of the system controller 18 can be implemented using analog and/or digital hardware (e.g., counters, switches, logic devices, memory devices, programmable processors, non-transitory computer-readable storage mediums), software, firmware, or a combination thereof. The system controller 18 can perform one or more of the functions described herein by executing software, which can be stored, for example, in a memory device. A person having ordinary skill in the art would be able to adapt (e.g., construct, program) the system controller 18 to perform the functionality described herein without undue experimentation. Although the system controller 18 is described as being discrete components separate from the image processor 16, in other embodiments the system controller 18 and the image processor 16, or one or more components thereof, can be combined into a single component.

Another aspect of the invention involves a method that includes the steps of: (i) using a RANSAC technique and/or a Hough Transform technique to identify a boundary 30 between an active portion 26 and an inactive portion 28 of a digital image generated using an imaging system 10; (ii) generating boundary data indicative of a characteristic of the boundary 30 (e.g., center, radius, position, shape, size, etc.); and (iii) automatically selecting and/or adjusting one or more settings of the imaging system 10 based on the boundary data. As will be apparent in view of the above-described functionality of the imaging system 10, the steps of the method can include various sub-steps of the above-described steps, and/or various other steps in addition to the above-described steps.

Another aspect of the invention involves a computer-readable medium storing instructions for performing steps including: (i) using a RANSAC technique and/or a Hough Transform technique to identify a boundary 30 between an active portion 26 and an inactive portion 28 of a digital image generated using an imaging system 10; (ii) generating boundary data indicative of a characteristic of the boundary 30 (e.g., center, radius, position, shape, size, etc.); and (iii) automatically selecting and/or adjusting one or more settings of the imaging system 10 based on the boundary data. The computer-readable medium can also store instructions for performing one sub-steps of the above-described steps. As will be apparent in view of the above-described functionality of the imaging system 10, the computer-readable medium can additionally store instructions for performing various sub-steps of the above-described steps, and/or various other steps in addition to the above-described steps. The computer-readable medium can be a non-transitory computer-readable medium (e.g., a non-transitory memory device). The instructions stored in the computer-readable medium can cause a component of the above-described imaging system 10 (e.g., the image processor 16, the system controller 18, and/or another component) to perform one or more steps of the above-described method.

The present disclosure describes aspects of the present invention with reference to the exemplary embodiments illustrated in the drawings; however, aspects of the present invention are not limited to the exemplary embodiments illustrated in the drawings. It will be apparent to those of ordinary skill in the art that aspects of the present invention include many more embodiments. Accordingly, aspects of the present invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

The invention claimed is:

1. An imaging system, comprising:
   a light source configured to illuminate an object with light;
   an imaging scope that captures light returning from the object and transmits the captured light in the form of a captured light beam having a cross-sectional shape that is at least partially circular;
   a camera configured to receive the captured light from the imaging scope and generate a digital image representative of the captured light, the camera including a zoom device and a light sensor, the zoom device configured to receive the captured light from the imaging scope before the captured light is received by the light sensor, the zoom device is selectively adjustable between a low magnification configuration and a high magnification configuration, wherein in the low magnification the zoom device magnifies the captured light such that the captured light occupies only a portion of the light-sensitive surface when received thereon, and in the high magnification the zoom device magnifies the captured light such that the captured light occupies all of the light-sensitive surface of the light sensor when received thereon;
   an image processor configured to receive the digital image from the camera, detect boundary points each corresponding to at least one pixel of the digital image, using a random sample consensus (RANSAC) technique to (i) process the boundary points to determine a shape and a position of a boundary between an active portion and an inactive portion of the digital image, the shape of the boundary being at least partially circular and (ii) generate a boundary data indicative of the shape and the position of the boundary, the image processor further including an error and reasonableness detector configured to receive the boundary data and a curve from the determined shape and determine whether or not a number of the boundary points lying within the curve satisfies a predetermined confidence measure and when the boundary points lying within the curve does not satisfy the predetermined confidence measure, the image processor is further configured to detect the boundary points again and update the detected boundary points with a minor perturbation until the boundary data satisfies the predetermined confidence measure; and
   a system controller configured to receive the boundary data that has satisfied the predetermined confidence measure from the image processor, and use said boundary data to select and/or adjust a digital zooming on the digital image.

2. The imaging system of claim 1, wherein the camera is releasably connected to the imaging scope; and
   wherein the imaging scope is a first type of imaging scope transmitting a light beam having a first cross-sectional-shape, and the camera is configured to be releasably connected to a second type of imaging scope, the second type transmitting a light beam having a second cross-sectional shape different than the first.

3. The imaging system of claim 1, wherein the image processor includes a grayscale converter configured to convert the digital image to a grayscale digital image;
   wherein the image processor includes a boundary point detector configured to filter the grayscale digital image to detect boundary points within the grayscale digital image, each of the boundary points corresponding to at least one pixel of the grayscale digital image that might possibly form a portion of the boundary.

4. The imaging system of claim 3, wherein the image processor includes a boundary point thinner configured to perform a non-maximal suppression on the boundary points, and to eliminate any boundary points that are unlikely to correspond to an area of transition between the active portion and the inactive portion of the digital image.

5. The imaging system of claim 1, wherein the single curve includes at least three of the boundary points.

6. The imaging system of claim 1, wherein the RANSAC technique includes:
   (a) randomly selecting a boundary point subset having at least three of the boundary points and determining a fit for the boundary point subset;
   (b) checking the fit against all of the boundary points to determine an inlier number for the fit, the inlier number being the number of all of the boundary points that lie within the fit;
   (c) repeating steps (a) and (b) a plurality of times to determine a fit and an inlier number for a plurality of boundary point subsets; and
   (d) selecting a best fit for the curve, the best fit being the fit having the inlier number with the greatest magnitude.

7. The imaging system of claim 6, wherein the fit for the boundary point subset is determined using at least one of a sum of squared error metric, a sum of absolute error metric, and a maximum absolute error metric.

8. The imaging system of claim 1, wherein the RANSAC technique includes:
   (a) randomly selecting a boundary point subset having at least three of the boundary point and determining a fit for the boundary point subset;
   (b) repeating step (a) a plurality of times to determine a respective fit for each of a plurality of boundary point subsets; and
   (c) for each of the respective fits determined in steps (a) and (b), comparing the respective fit with all of the boundary points to determine a median error measurement for the respective fit; and
   (d) selecting a best fit for the curve, the best fit being the respective fit having the lowest median error measurement.

9. The imaging system of claim 8, wherein the fit for the boundary point subset is determined using at least one of a sum of squared error metric, a sum of absolute error metric, and a maximum absolute error metric.

10. The imaging system of claim 1, wherein the image processor is configured to fit the curve to the boundary points using a best fit of boundary points detected from a previously-analyzed digital image.

11. The imaging system of claim 1, wherein the image processor is configured to additionally use a Hough Transform technique to identify the boundary and generate the boundary data, the Hough Transform technique including:
(a) providing an array of index points, each index point corresponding to a radius and center coordinates of a candidate fit for the boundary points;
(b) initializing all of the index points with zeros;
(c) for each of the boundary points, incrementing a count of each of the index points corresponding to candidate fits that include the respective boundary point; and
(d) selecting a best fit, the best fit being the candidate fit corresponding to the index point with a count that is greatest in magnitude.

12. The imaging system of claim 1, wherein the image processor includes an error and reasonableness detector configured to receive the boundary data and the curve and determine whether the curve is reasonable in view of a displayable area of the digital image.

13. The imaging system of claim 1, wherein the system controller is configured to use the boundary data to automatically select at least one of an exposure setting and a gain setting of the camera.

14. The imaging system of claim 1, wherein the system controller is configured to use the boundary data to filter noise in the inactive portion of the digital image.

15. The imaging system of claim 1, wherein the active portion of the digital image corresponds to an interior portion of the light-sensitive surface that was occupied by the captured light, and the inactive portion of the digital image corresponds to a peripheral portion of the light-sensitive surface that was not occupied by the captured light.

16. The imaging system of claim 1, wherein the imaging scope includes an image transmission device that transmits the captured light from an objective lens located proximate a distal end of the imaging scope to a proximal end of the imaging scope, wherein the camera is disposed relative to the proximal end of the imaging scope.

17. The imaging system of claim 1, wherein the camera is a video camera, and the digital image generated by the light sensor represents one of a plurality of time-sequenced frames of a digital video.

* * * * *